Jan. 30, 1968  D. WEINSTEIN ET AL  3,366,486
EDIBLE CONTAINERS FOR FOODS
Filed Aug. 24, 1965
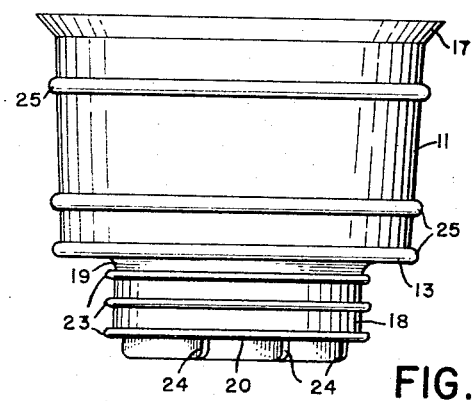
FIG. 1.
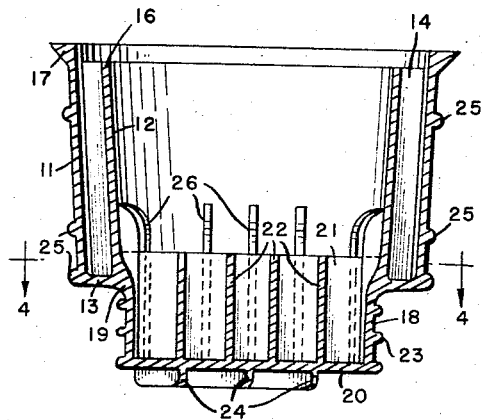
FIG. 3.
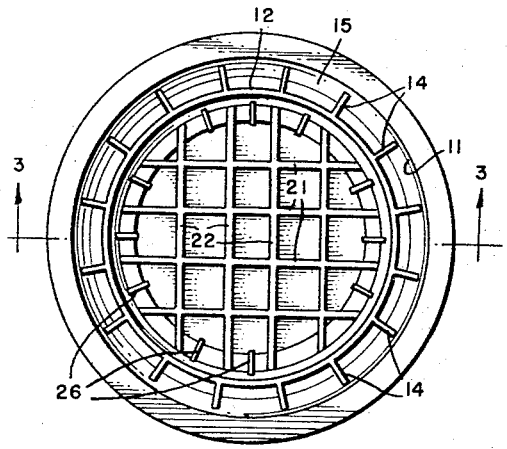
FIG. 2.
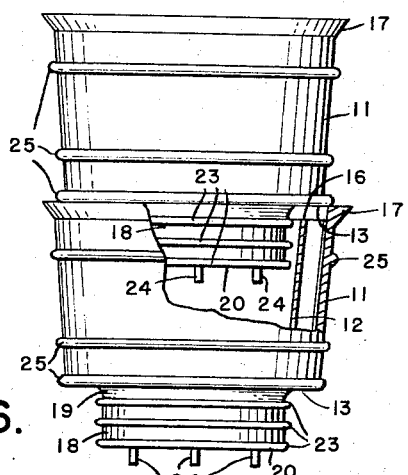
FIG. 5.
FIG. 6.
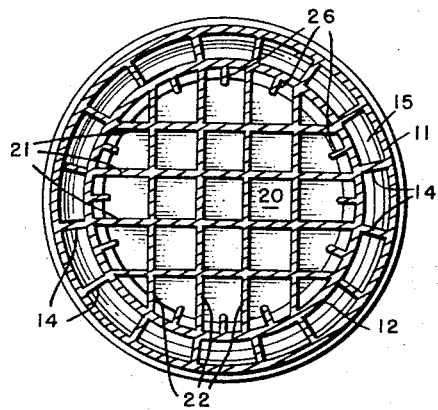
FIG. 4.
INVENTORS
DAVID WEINSTEIN
ALBERT A. HEYMAN
BY Albert J. Kramer
ATTORNEY United States Patent Office 3,366,486
Patented Jan. 30, 1968

3,366,486
EDIBLE CONTAINERS FOR FOODS
David Weinstein and Albert A. Heyman, Baltimore, Md., assignors to Maryland Baking Co., Inc., Baltimore, Md., a corporation of Maryland
Filed Aug. 24, 1965, Ser. No. 482,120
4 Claims. (Cl. 99—89)

ABSTRACT OF THE DISCLOSURE

A food container especially for hot foods is provided of an edible pastry shell having a thermally insulating double walled upper section, a single walled lower section with internal ribs in the lower section extending up into the upper section for supporting hot foods at the level of the thermally insulating double walls of the upper section. The lower section is inwardly stepped to clear a rim portion of the bottom section for nesting with a similar container. A series of parallel ribs are also provided on the exterior of the bottom of the lower section to support the cup in an upright position on a horizontal surface and permit free ventilation along the bottom wall to minimize condensation which might otherwise collect and render the pastry material soggy.

---

This invention relates to edible containers and it is more particularly concerned with containers for holding food products.

An object of the invention is the provision of a food container which can be used to hold foods such as spaghetti, chili con carne, chow mein, chop suey, salads of various kinds and, generally, foods in comminuted form.

A specific object of the invention is the provision of such containers which can be used to hold hot foods and which are resistant to collapse from the effects of contact with such hot foods.

Another object of the invention is the provision of such a container which is easy to handle and which can be held in the hand of a person and carried about with the food placed therein, such as in the case of an ordinary ice cream cone.

A further object of the invention is the provision of an edible container for use in so-called "carry-out" shops, whereby the food served can be consumed along with the container, thereby obviating the need for throw away containers such as those made of paper, plastic and other non-edible materials and also obviating the need for disposal stations for such throw away containers with the consequent economic loss of materials, space and labor involved in such disposal stations.

A further object is the provision of an edible food container that has a crisp texture and which can be used to substitute for the noodles of chow mein, for example, in the serving of such foods.

A still further object is the provision of an edible container of the type mentioned, which is so constructed as to be capable of nesting with like containers for the purpose of storage and also to lie in an erect and functional position on a horizontal surface, such as a serving table or tray.

These and still further objects, advantages and features of the invention will appear more fully from the following description considered together with the accompanying drawing, which illustrates an embodiment of the invention.

In the drawing:
FIG. 1 is an elevational view of a container, comprising an embodiment of the invention.
FIG. 2 is a top plan view of the embodiment.
FIG. 3 is a vertical sectional view along the line 3—3 of FIG. 2.
FIG. 4 is a horizontal sectional view along the line 4—4 of FIG. 3.
FIG. 5 is a bottom plan view.
FIG. 6 is an elevational view, partly broken away, of two of the containers in nested relation.

Referring to the drawing with more particularity, the embodiment illustrated comprises a container formed of conventional pastry or farinaceous material, such as those of which ordinary "ice cream cones" are made. However, the flavoring ingredients may be modified as desired for any specific foods to be served therein. For example, a product having more salt and less sweetening may be provided for foods such as spaghetti, chow mein, and chili con carne.

The embodiment has an upper portion comprising a frusto-conical outer wall 11 and a coaxial continuous frusto-conical inner wall 12 of smaller diameter which are in radial spaced relation. These two walls 11 and 12 are connected to each other at the bottom by a horizontal annular shelf 13. Radial reinforcing ribs 14 connect the two walls at intervals in the circumferential space 15 therebetween.

The upper end 16 of the inner wall terminates in a plane below the plane of the upper end of the outer wall 11, the latter being provided with an enlarged reinforcing edge or bead 17.

The lower section of the embodiment comprises a single cylindrical wall 18 connected to the inner wall 12 by a curved annular section 19. The lower section also comprises a bottom circular wall 20. Projecting upwardly from the bottom wall 20 is an array of orthogonally disposed vertical fins 21 and 22, forming a grid that not only reinforces the walls 18 and 20 but provides an offsetting support for food placed in the container. Many semi-fluid foods will be entirely supported by this structure. Others may exude an amount of liquid which can be absorbed by these fins before reaching the bottom wall 20, thereby retaining the bottom wall in a crisp condition for a substantial period sufficient to permit consumption of the item.

The cylindrical wall 18 is provided with annular reinforcing beads 23 on the exterior side. The dimensions of the wall and of these beads are smaller than the inside diameter of the upper end 16 of the inner wall 12 to permit nesting as illustrated in FIG. 6. In this nested relation, the annular shelf 13 functions as a support against the beaded edge 17 of an underlying like container.

Protective and strengthening ribs 24 are provided along the bottom of the wall 20. These ribs not only strengthen the bottom wall but hold it in spaced relation to a horizontal surface on which it may be resting and which may contain a material detrimental to the wall, such as spilled coffee, water, etc.

These ribs also provide ventilating space between the bottom wall 20 and a horizontal surface on which the cup may be resting which tends to overcome a condensation of moisture at the bottom. Such moisture is detrimental to the cup because it tends to make it soggy.

Additional concentric beads 25 may be provided on the exterior of the outer wall 11 to facilitate holding the container in the hand without slippage while being consumed.

Additional reinforcing ribs 26 extend vertically along the inner side of the wall 18 upwardly along the section 19 and terminate a short distance thereabove along the inner side of the inner wall 12. These reinforce the relatively weak area of the section 19 which is particularly vulnerable to damage under the weight of food placed in the container.

Having thus described my invention, we claim:
1. An air jacketed food container for hot semi-fluid foods comprising an edible pastry shell having a double walled upper section with an open top and a single walled bottom section with a closed lower end, said upper section comprising concentric inner and outer walls disposed parallel to each other to form an annular thermally insulating space therebetween, said outer and inner walls extending substantially the entire length of the upper section, a series of circumferentially spaced vertical ribs in said annular space connecting said inner and outer walls, a bottom wall in the annular space, said bottom section being inwardly stepped to clear said bottom wall and to nest in the open top of the upper section of a like container, and food offsetting ribs in the bottom section extending from the bottom of the single walled bottom section into the lower end of the double walled upper section.

2. A food container as defined by claim 1 in which the bottom wall of the annular space has an outwardly extending annular lip adapted to engage the rim at the upper end of the outer wall of a like container in nested relation.

3. A food container as defined by claim 1 and a plurality of parallel ribs on the exterior at the bottom of the container to retain the bottom in an elevated position on a supporting surface and permit circulation of ambient air between the bottom and the supporting surface.

4. A food container as defined by claim 1 and spaced reinforcing ribs extending on the interior of the container between said upper and lower sections.

References Cited

UNITED STATES PATENTS

| | | | |
|---|---|---|---|
| 2,435,906 | 2/1948 | Shapiro | 99—89 |
| 2,697,041 | 12/1954 | Graham | 99—89 |
| 2,759,826 | 8/1956 | Lindsey | 99—88 |
| 2,862,820 | 12/1958 | Downie | 99—89 |
| 2,877,117 | 3/1959 | Heyman | 99—89 |
| 3,086,484 | 4/1963 | Ibex | 99—88 X |

HYMAN LORD, *Primary Examiner.*

JOSEPH M. GOLIAN, *Examiner.*

J. M. HUNTER, *Assistant Examiner.*